(12) United States Patent
Gotze et al.

(10) Patent No.: US 6,466,216 B1
(45) Date of Patent: Oct. 15, 2002

(54) COMPUTER SYSTEM WITH OPTIMIZED DISPLAY CONTROL

(75) Inventors: Volkmar Gotze, Grafenau; Martin Neumann, Sindelfingen, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/737,300

(22) PCT Filed: Jun. 7, 1995

(86) PCT No.: PCT/EP95/02187

§ 371 (c)(1),
(2), (4) Date: Oct. 11, 1996

(87) PCT Pub. No.: WO96/41324

PCT Pub. Date: Dec. 19, 1996

(51) Int. Cl.[7] .................................. G06F 15/00
(52) U.S. Cl. ................ 345/501; 345/545; 345/554
(58) Field of Search .................. 345/521, 501, 345/509, 507, 519, 512, 1.2, 3.1, 520, 531, 530, 545, 554; 711/100, 105, 151, 149, 154, 158

(56) References Cited

U.S. PATENT DOCUMENTS

| | | | | |
|---|---|---|---|---|
| 4,704,697 A | * | 11/1987 | Kiremidjian et al. | ....... 345/512 |
| 5,201,037 A | * | 4/1993 | Kohiyama et al. | .......... 345/518 |
| 5,335,322 A | * | 8/1994 | Mattison | ..................... 345/501 |
| 5,363,500 A | * | 11/1994 | Takeda | ........................ 345/507 |
| 5,488,384 A | * | 1/1996 | Uehara et al. | ................. 345/1 |
| 5,592,597 A | * | 1/1997 | Kiss | ........................... 345/419 |
| 5,606,650 A | * | 2/1997 | Kelley et al. | ................ 345/515 |
| 5,699,086 A | * | 12/1997 | Shimizu | ..................... 345/507 |

FOREIGN PATENT DOCUMENTS

| | | | | |
|---|---|---|---|---|
| JP | 61208553 A2 | 9/1986 | ........... | G06F/12/00 |
| JP | 3130798 A2 | 6/1991 | ........... | G09G/5/00 |
| JP | 5165445 A2 | 7/1993 | ........... | G09G/5/00 |

OTHER PUBLICATIONS

Computer Graphics: Principles and Practice, second Edition by Foley et al, pp. 166–170, 1987.*

* cited by examiner

Primary Examiner—Kee M. Tung
(74) Attorney, Agent, or Firm—Antony P. Ng; Bracewell & Patterson, LLP

(57) ABSTRACT

A computer system having an optimized display controller is disclosed. The computer system has a central processing unit connected to a system bus. Within the computer system, both a system memory and a video memory are connected in parallel to the system bus. In addition, the computer system also includes a display controller that is connected only between the system bus and a video display.

8 Claims, 4 Drawing Sheets

STATE OF THE ART

COMPUTER SYSTEM WITH OPTIMIZED DISPLAY CONTROL

TECHNOLOGY

The invention covers a computer system with an optimized controller for the display unit of the computer system. The invention further covers a process of optimized access to the display memory of a computer system as well as the use of means of sequencing memory access in a computer system for the sequencing of memory accesses to the display memory of a computer system. The invention can be applied to the control of display units in a multitude of computer systems particularly for the screen control of computer systems which are relatively small and cheap yet powerful and robust, such as mobile applications.

CURRENT TECHNOLOGY

Current technology has control facilities for the display unit of a computer system with connections to a first, primary bus system, as well as connections to a second, secondary bus system. These control facilities for the display unit of a computer system are also frequently called DISPLAY or VIDEO controllers.

The first, primary bus system has a special address and data bus. Using this primary bus system, the control facility controls for the display unit the necessary refresh cycle of the display memory using random access architecture (DRAM, dynamic random access memory), which is also frequently known as VIDEO memory.

The second, secondary bus system also has an address and data bus which connects the control facility for the display unit with the central control unit of the computer system, which is also frequently called the CPU (central processing unit). New display information which has been analysed by the central control unit is written in the display memory via this secondary bus system and/or display data is read from the display memory for current calculations in the central control unit.

Each of the bus systems has a data bus, an address bus and a control bus. These buses can be basically implemented as both bit parallel buses and as bit serial buses. Generally, these bus systems are implemented as bit parallel buses due to the transmission performance required.

Both of these independent bus systems are required to prevent access conflict to the display memory of the central control unit on the one hand, and of the control facility for the display unit on the other. Different CPU and microprocessor families have components which initialise the control facility function for the display unit, such as the VIDEO controller MC 6845 by MOTOROLA from the 6800 microprocessor family, or the VIDEO controller 8275 by INTEL from the 8080 microprocessor family.

In the book by U. Tietze and C. Schenk "Semi-conductor switching technology" ("Halbleiter-Schaltungstechnik"), Springer-Verlag, 5th edition, 1990, Berlin-Heidelberg-New York, on pages 526 to 593, the components of a microcomputer system and its functional interfaces are explained. In addition to the block diagram of a microcomputer on page 527, FIG. 21.1, the FIG. 21.54 on page 588 in particular shows an overview of microcomputer peripheral connections such as, for example, the VIDEO controller. These peripheral connections are normally accommodated on the computer system board or on a special push-in card.

Disadvantages of the Current Technology

VIDEO controller components have a large number of connections, particularly bus line connections, due to the bus architecture having a first, primary bus system and a second, secondary bus system. The number of electrical connections, which are often called pins in integrated circuits, have a considerable effect on the manufacturing costs of a component. This large number of electrical connections therefore increases the manufacturing costs of a VIDEO controller.

In addition, electrical components and the associated electrical contacts are frequently a cause of faults in an electrical system, as the electrical contacts do not have sufficiently long-term stability due to dirt, mechanical stress, corrosion, material fatigue and contact erosion, etc. The number of electrical contacts has, therefore, a considerable effect on the functional security of an electrical system. Thus a large number of electrical contacts increases the susceptibility to faults of a VIDEO controller.

In addition, the requirement of having two bus systems means considerable expenditure due to material costs and the installation costs of the second bus system. In addition, a second bus, system requires additional space, both on a board in the computer system and also in the housing of the computer system.

Task

The invention is based on the task of developing a VIDEO controller which requires a low number of electrical contacts.

Solution to the Task

This task is solved by the invention through a device which has the characteristics shown in Claim 1.

There are advantages in that through the connection of the central control unit, the control facility for the display unit and the display memory to the common system bus only one bus system is required, and all electrical connections which were required for the primary bus system under current levels of technology no longer apply. In this way, there is a significant and advantageous reduction in the number of electrical connections on the control facility for the display unit. This means not only an advantage in costs but also the advantage of increased reliability in the computer system.

There are further advantages in that a complete bus system can be saved, which again means cost advantages for the computer system through savings in material costs and installation costs for the second bus system. In addition, there is an advantage in saving a complete bus system in that space is saved on the board of the computer system as well as in the computer system housing, which will make the computer smaller and lighter.

Yet another advantage is that in addition to a bus system, the associated driver blocks and buffer blocks can also be saved, which means not only a reduction in costs but also a lower consumption of energy.

Another advantage is that through the means of sequencing memory accesses, correct and valid access to the display memory, and in particular data integrity is guaranteed. These means of sequencing memory accesses make sure that only one component of the computer, the central control unit or the control facility for the display unit, can access the display memory. Thus collisions in memory access are advantageously avoided. The components which can access the display memory use the system bus for this.

The central control unit of the computer can be a CPU (central processing unit), a microprocessor or a microcontroller, for example. The display unit can be a cathode-ray tube, an active or passive liquid crystal display, a gas plasma panel, a field emitting cathode display or any other display facility.

The means of sequencing the memory accesses can, for example, be realised using separate control lines, which connect the components which want to access the system bus to the central control facility. Each time a component wants to access the bus, it sends a signal via the separate control line and in this way requests the right-to-access the bus (BUS REQUEST). The bus access is released by another signal (BUS RELEASE). These separate control lines can be designed as open common collectors or as open common drains.

In a similar way, the means of sequencing the memory accesses can be realised through a design which touches on the process of direct memory access (DMA) or on multi-master bus design. These designs are described in the current state of technology above (U. Tietze and C. Schenk: "Semi conductor switching technology" ("Halbleiter-Schaltungstechnik"), Springer-Verlag, 5th edition, 1990, Berlin-Heidelberg-New York).

In addition, other means of sequencing memory access is possible, such as right-to-access using a token procedure linked with an electronic token, the possession of which gives the right of access, or through a central control unit which distributes bus access, or through a hierarchical structure of components with regard to the right-of-access to the bus, with bus access issued according to a prescribed scheme of priority.

Normally, a work data memory is connected to the system bus, and this is usually a memory with optional access (RAM, random access memory), either as a static memory (SRAM) or as a dynamic memory (DRAM). In addition, a read-only memory (ROM) is often connected to the system bus of the computer. The display memory is normally a memory with optional access (RAM, random access memory), a dynamic memory (DRAM) for example.

In one form of the invention, the device has the characteristics of Claims 2 and 3.

Here it is advantageous that through the use of a video memory (VRAM) with dual port architecture, the additional serial access memory of which is frequently known as SAM (serial access memory), a considerable reduction in access cycles is achieved on the part of the control facility for the display unit. With the additional serial access memory of the VRAM, it can also deal with a separable, serial access memory, frequently known as SPLIT-SAM. This serial access memory transfers the stored data to the display unit via the data line.

At each memory access, a whole lot of display data for the display unit is advantageously transferred to the SAM or SPLIT-SAM, and from there routed to the display unit. Through this reduction in memory accesses for the purpose of displaying display data, these transfer memory accesses can be interconnected very advantageously with the write/read process of the central control unit. By using display memories with a separable, serial access memory, the memory accesses for the display of display data can be reduced, for example, to 1/256.

It is advantageous that through determining priorities for memory access of the control facility for the display unit to one particular time, fault-free display building in the display unit is guaranteed and at that particular time a fault-free display corresponding to the current contents of the display memory can be displayed. In particular, the priority can be determined in such a way that the control facility for the display unit occupies the system bus whenever it is necessary and, if necessary, the central control unit must wait for the release of the system bus.

It is advantageous that the control facility for the display unit is integrated in one component of the computer which is also connected to the system bus, as this guarantees a further reduction in the number of electrical connections and contacts. The component in which the control facility for the display unit is integrated already has a system bus connection and therefore no further connections for the control facility for the display unit are required. In addition, space requirements for the control facility on the computer board is reduced by the integration of the control facility for the display unit, resulting in savings in weight and manufacturing costs. Equally, the reliability of the computer is increased, as the number of components in the computer is reduced.

It is advantageous that the integration of the control facility for the display unit in the central control unit of the computer further simplifies the sequencing of memory accesses. In this, the number of electrical connections required is further reduced, and thereby provides an economical and reliable solution. In addition, integration offers increased processing speed as all signals are supplied on one single electric circuit. In particular, the means of sequencing can be integrated advantageously in the central control unit and thus the total functionality of the central control unit and the control facility for the display unit can be realised economically, compactly and reliably in one component with minimum delay time.

It is advantageous that the PowerPC microcontroller is particularly suitable for processing control tasks at high speed due to its RISC architecture; the integration of the control facility for the display unit of a computer, as in the invention, can be achieved with low costs and minimal developmental effort and guarantees reliable and economical operation. The PowerPC microcontroller is part of the PowerPC processor family, a family of modern and high-powered microprocessors and micrcontrollers. The PowerPC microcontroller can be acquired through IBM Deutschland Sales or through the IBM Corporation.

It is advantageous that in addition to the control facility for the display unit in the invention, other functions can be integrated simultaneously on a common function platform, for example, in the case of a motor vehicle this might be engine control, air conditioning control, navigation, display units as well as audio and video applications. The function platform has, for example, in addition to a PowerPC microcontroller with an integrated hierarchical processor architecture, DRAM memory and display units as well as bus drivers and bus interfaces for different data buses.

It is advantageous that on the central control unit accessing data in the display memory via the system bus, and by the control facility for the display unit also accessing the display memory using the system bus, only one bus system is required, and all electrical connections which are required for the primary bus system in the current state of technology are no longer needed. In this way the number of electrical connections of the control facility for the display unit can be advantageously and significantly reduced. In addition to advantages in costs, this also means increased reliability in the computer.

There is an additional advantage in that a complete bus system can be saved which again means cost advantages in savings in material costs and installation costs of the second bus system for the computer. A further advantage is that in saving a complete bus system, space is saved on the board as well as in the computer housing, which will make the computer both smaller and lighter.

A further advantage is that in addition to savings on a bus system, the associated driver and buffer blocks can be saved, which means not only savings in costs but also a lower consumption in energy.

Another advantage is that through the means of sequencing memory accesses, correct and valid access to the display memory, and in particular data integrity is guaranteed. The sequencing of memory accesses makes sure that only one component of the computer, the central control unit or the control facility for the display unit can access the display memory. Thus collisions in memory access are advantageously avoided The components which can access the display memory use the system bus for this.

It is advantageous that by using VR display memories with a separable, serial access memory, frequently known as a SPLIT-SAM, the accesses to the display memory for the display of display data on the display unit are considerably reduced, and that by allowing priority to the memory accesses of the control facility for the display unit at a particular time, fault-free display building is guaranteed the display unit and at any one time a fault-free display corresponding to the current contents of the display memory can be displayed.

It is advantageous that the use of means for sequencing memory accesses guarantees dealing with memory accesses of a central control unit and memory accesses of a control facility for a display unit to the display memory in a computer via a common system bus, and connects the control unit, the control facility for the display unit and the display memory to the system bus of the computer, so that a further bus system as required under the current state of technology can be saved. Thus a computer can advantageously be made with savings in space and weight, which can be manufactured economically and can guarantee fast processing speeds and a high level of reliability.

The display memory can be, for example, a video memory with optional access (VRAM) with a separable, serial access memory (SPLIT-SAM). Sequencing can allow the display memory priority in access to the control facility for the display unit and buffer memory access of the central control unit to data in the display memory, in case the central control unit temporarily has no right-of-access.

It is advantageous that by using a system bus in a computer to transmit accesses of the central control unit and accesses of the control facility for the display unit to the display memory, an additional bus system as required under the current state of technology can be saved. Thus a computer can advantageously be made with savings in space and weight, which can be manufactured economically and can guarantee fast processing speeds and a high level of reliability.

DESCRIPTION OF THE DRAWINGS

One embodiment of the invention is shown in the drawings and is described more closely in the following.

They show.

Figure 1:
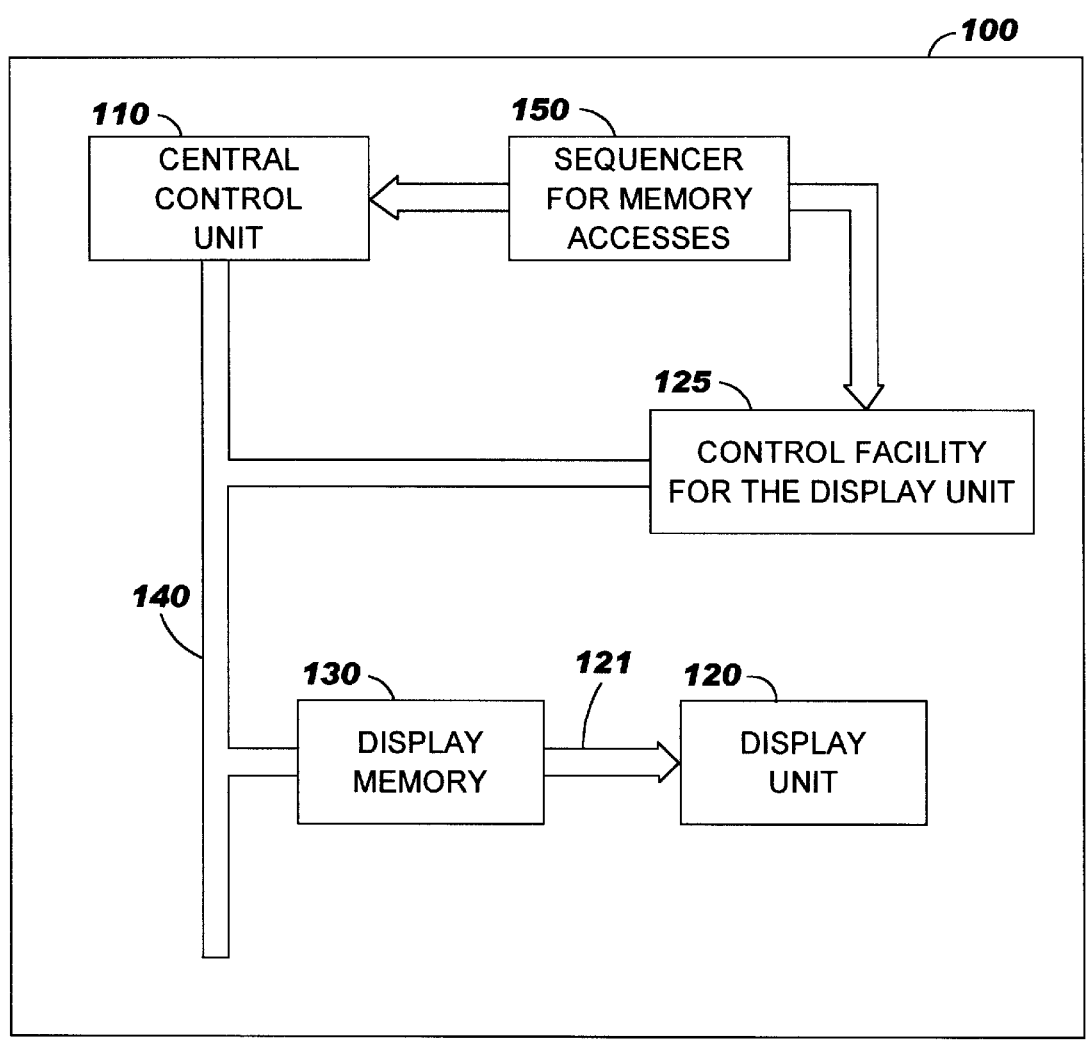
FIG. 1: A block diagram of the location and configuration of the components of the computer.

The block diagram of the computer system 100 in FIG. 1 shows the central control unit 110 which, for example, could be a CPU (central processing unit), a microprocessor or a microcontroller. The central control unit is connected to a system bus 140, which consists of a data bus, an address bus and a control bus. In addition, connected to the system bus 140 there is the control facility 125 for the display unit of the computer 100 and the display memory 130. The display memory can be a memory with optional access, for example, a DRAM memory or a VRAM memory. The display unit 120 of the computer 100 is connected to the display memory 130 via a data line 121. The display unit 120 can, for example, be a cathode ray tube, an active or a passive liquid crystal display, a gas plasma panel, a field emitting cathode display or another sort of display. The memory accesses of the central control unit 110 and the control facility 125 for the display unit are carried out using the system bus 140.

Figure 2:
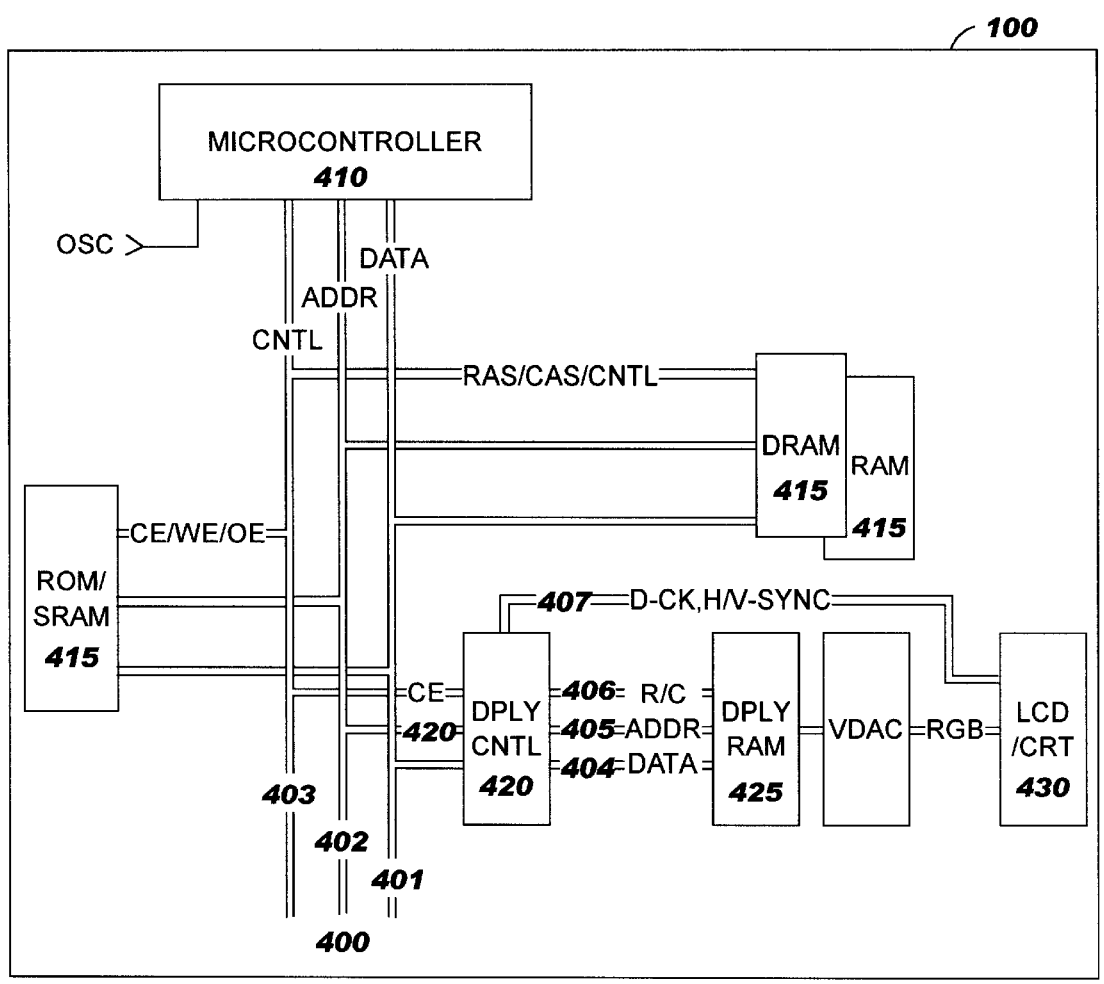
FIG. 2: A controller for a computer with a control facility for the display unit with signal paths, as at the current state of technology.
Figure 3:
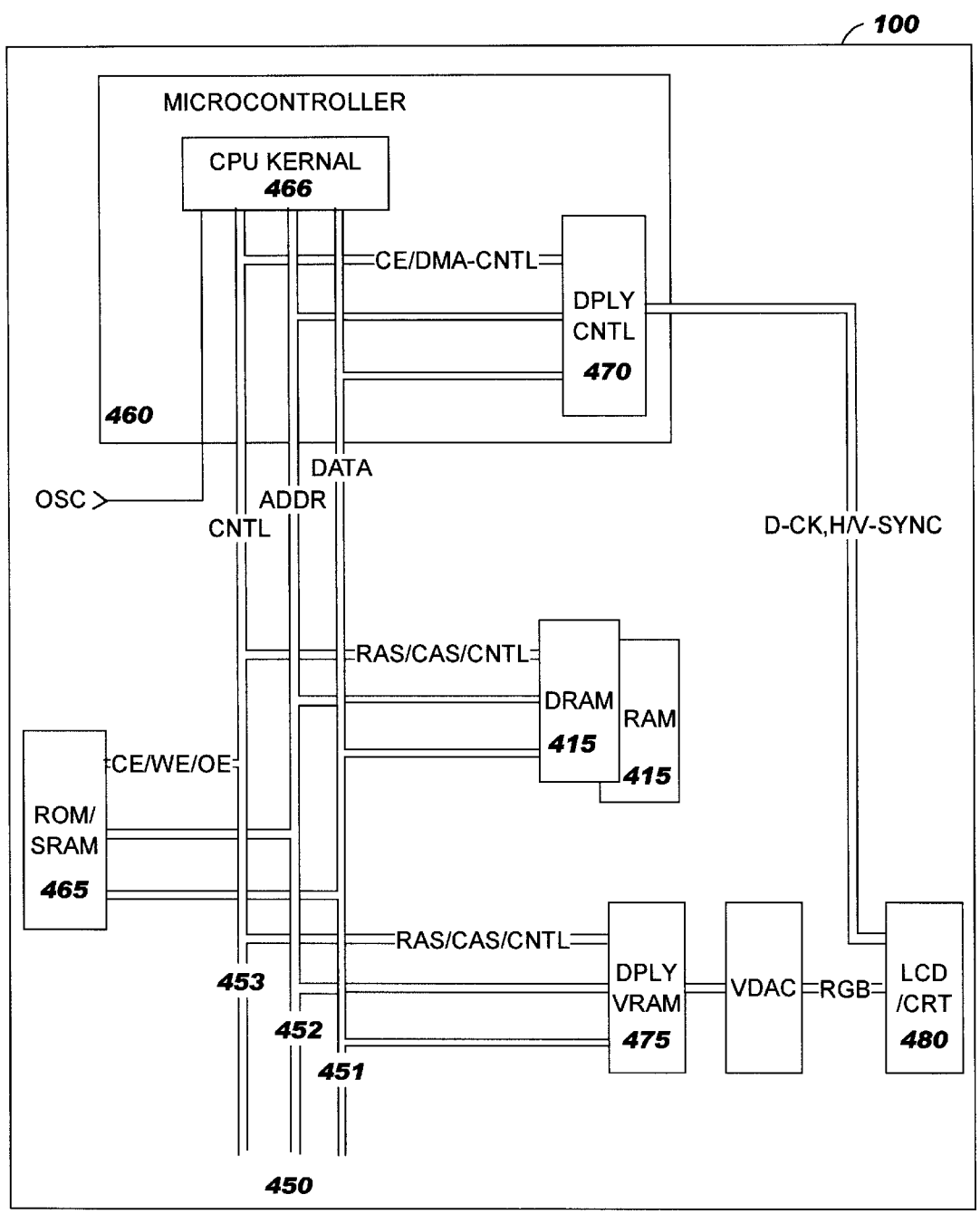
FIG. 3: A diagram of a form of the computer according to the invention with a control facility for the display unit with signal paths.

The function blocks shown in FIGS. 1, 2 and 3 are equivalent to the following:

| Description | FIG. 1 | FIG. 2 | FIG. 3 |
|---|---|---|---|
| Central control unit | 110 | 410 | 466 |
| Display unit | 120 | 430 | 480 |
| Control facility for the display unit | 125 | 420 | 470 |
| Display memory | 130 | 425 | 475 |
| System bus | 140 | 400 | 450 |

The computer 100 shown in FIG. 2 has a control facility for a display unit with signal paths according to the current state of technology. Pertinent is the fact that the central bus system 400, consisting of a data bus 401, an address bus 402 and a control bus 403, has connected to it a microcontroller 410, a memory unit 415 and a control facility 420 for the display unit (DPLY CNTL).

The memory unit 415 can be a read-only memory (ROM), and/or a static memory with optional access (SRAM) and/or a dynamic memory with optional access (DRAM). The control facility 420 for the display unit (DPLY CNTL) has connections to a display or video memory (DPLY RAM) 425, consisting of a data bus 404, an address bus 405 and a line and column signal (RAS, CAS) and, if necessary, further control signals 406. In addition, the control facility 420 for the display unit has a connection 407 to the display unit (LCD/CRT) 430 for the transmission of horizontal and vertical synchronisation signals (H/V-SYNC) and, in the case of LCD displays, the pixel data clock (D-CK).

The display unit 430 can be a liquid crystal display (LCD) or a cathode ray tube (CRT), for example. The digital red/green/blue data from the display memory 475 are converted by a digital analog converter (VDAC) to an analog red/green/blue signal (RGB), and thus the display unit 430 is made ready in case the display unit 430 cannot directly process the digital red/green/blue data.

The computer 100 according to the invention shown in FIG. 3 with a control facility (DPLY CNTL) 470 for the display unit with signal paths, also has a central bus system 450, consisting of a data bus 451, an address bus 452 and a control bus 453, to which a CPU kernel 466, a memory unit 465 and a control facility (DPLY CNTL) 470 for the display unit are connected.

The memory unit 465 can be a read-only memory (ROM) and/or a static memory with optional access (SRAM) and/or a dynamic memory with optional access (DRAM). The control facility (DPLY CNTL) 470 for the display unit has, other than the connection to the central bus system 450, no other connection to the display memory 475; in particular only a connection between the control facility (DPLY CNTL) 470 for the display unit and the display unit (LCD/CRT) 480 is required; on this connection signals for the transmission of horizontal and vertical synchronisation signals (H/V-SYNC) are transmitted and, in the case of-LCD displays, the pixel data clock, if required.

Because of this arrangement and due to the direct memory access capabilities of suitable microcontrollers, such as the PowerPC microcontroller 460, for example, it is possible to connect the video memory (DPLY VRAM) 475 directly to the central bus system 450. The CPU kernel 466 can be integrated together with the control facility (DPLY CNTL) 470 in the microcontroller 460.

Memory access conflicts with regard to the display memory 475 are solved through a control mechanism similar to the method of the direct memory access (DMA) or the multimaster bus arrangement. The control facility 470 for the display unit requests the central control unit of the computer 100 or the CPU kernel 466 for the release of the system bus 450.

After the release of the system bus 450, the control facility 470 for the display unit uses the system bus 450 in order to transmit the start address and control information to the display memory 475. The display memory 475 copies data from a display line into its serial access memory (SAM), corresponding to the transmitted information. After filling the serial access memory (SAM), the control facility 470 for the display unit re-releases the system bus 450 for use through other components of the computer system 100 or through the CPU kernel 466.

When the control facility 470 for the display unit registers the end of a horizontal display line in its internal counters with their associated comparators, a double access to the system bus 450 is requested via the BUS REQUEST mechanisms. On release of the system bus 450, the start of the next display line, at least 257 pixels, is copied into the serial access memory via a VRAM "Read transfer cycle". This access can tolerate a maximum delay of the duration of both display edges as well as the horizontal synchronisation pulse, a total of several microseconds. Even the following accesses within this picture line for display have a relatively large margin in time of, again, several microseconds. However, the access of the control facility 470 for the display unit must have the highest priority on the system bus 450 after the memory refresh logic of the computer 100.

The described method of procedure has an effect outside the microcontroller 460 of an insignificant increase in the bus load. Write and read accesses to the display memory 475 are carried out as on the main memory of the computer system 100, as the display memory 475 is connected parallel to the main memory of the computer 100 on the system bus 450, and is addressed as another memory bank with its own CAS or RAS line.

Whenever an access is required to the display memory 475 through the control facility 470 for the display unit for the purpose of refreshing the display, any memory requests from the CPU kernel must wait in a queue through a sequencing operation. Then the access of the control facility 470 to the display unit is released. This type of architecture permits the display memory 475, the data word width of which is now independent of the associated control facility 470 for the display unit, to be operated parallel to the main memory of the computer system on the system bus 450.

If the microcontroller used already has these multimaster or DMA capabilities and facilities, then this functionality can be used without essential changes; this is the case, for example, with an IBM PowerPC microcontroller 403.

Figure 4:
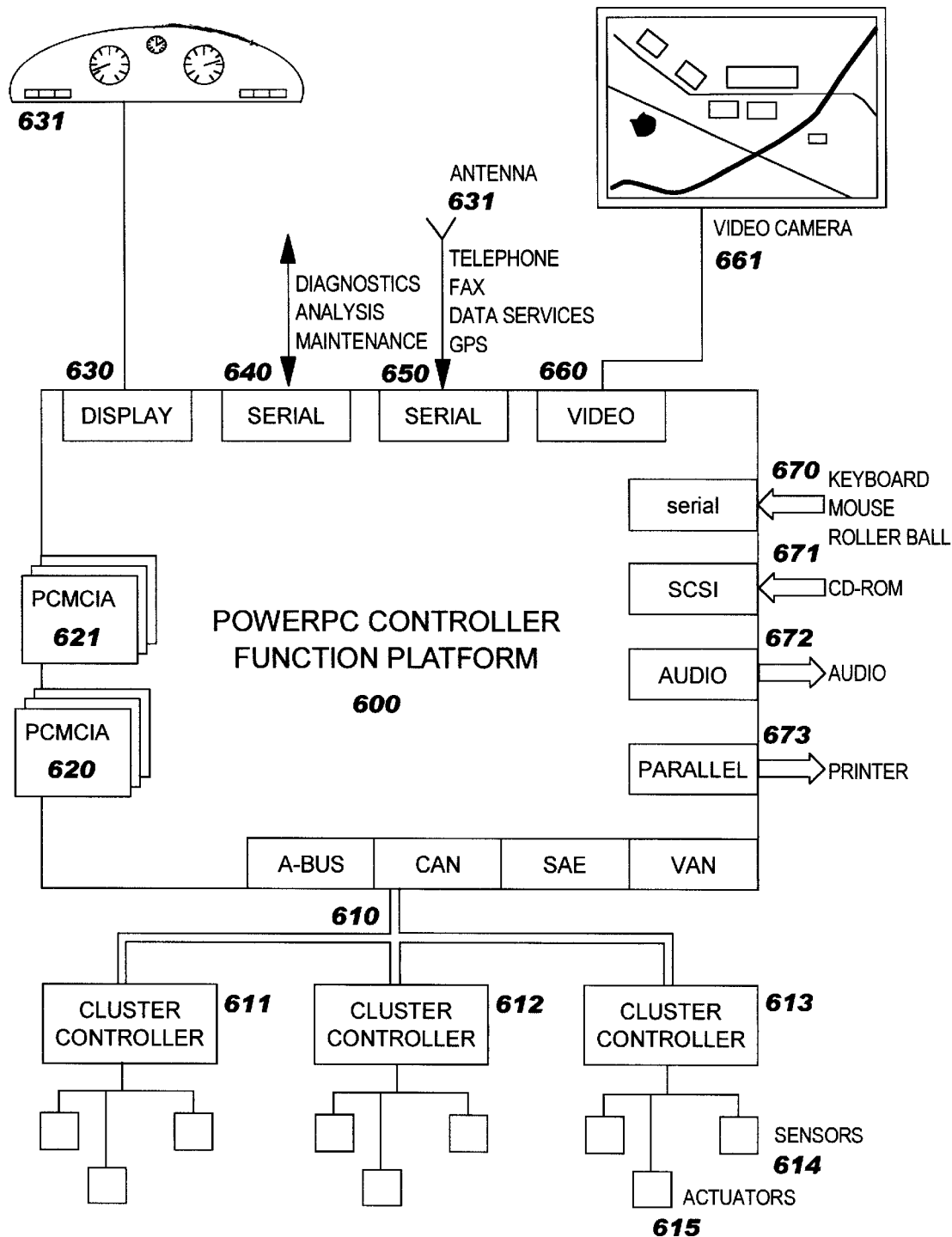
FIG. 4: A central function platform for the control of different functions in a motor vehicle using the computer according to the invention with optimised display control.

In FIG. 4, the function platform 600 for the central control of different functions in a motor vehicle by means of a PowerPC controller, has a display output 630, which controls a display unit or instrument panel 631. The control facility for the display unit is integrated in the PowerPC microcontroller in the invention, and sends information via a system bus to the function platform 600.

In addition, the function platform 600 has the control capability of a A-bus data bus 610, which again has several cluster controllers 611, 612 and 613, to which the sensors 614 and the actuators 615 are connected. In addition to the possibility of controlling further automotive field buses, the function platform 600 has a first PCMCIA (personal computer memory card international association) interface 620 for connection to memory media, such as FLASH memory cards or magnetic storage disks. These memory media can contain, for example, user- or vehicle-specific data or even a user identification or access authorisation. In addition, the function platform 600 has a second PCMCIA (personal computer memory card international association) interface 621 for connection to new application programs or for data communication.

An additional interface 640 permits vehicle diagnostics and, if required, fault analysis as well as data exchange on the occasion of maintenance work on the vehicle. In addition, using an interface 650 with attached antenna 651, cordless data services can be used, for example telephone, fax or position location using GPS. Using a suitable interface 660 with a connected video camera 661, route-specific information can be gathered and taken into account.

In addition, the function platform 600 has a serial interface 670 for the connection of input media such as keyboards, mouse or roller ball, an SCSI type interface 671 for the connection of mass storage media such as a CDROM or a magnetic tape, an AUDIO interface 672, for example, for command inputs or information outputs using speech, and a parallel interface 673 for information output using a printer, for example.

What is claimed is:

1. A computer system, comprising:

a central processing unit connected to a system bus, a system memory connected to said system bus;

a video memory connected to said system bus;

a video display; and a display controller connected only between said system bus and said video display, wherein a data width of said video memory is independent of a data width of said display controller.

2. The computer system according to claim 1, wherein said video memory is further coupled to said video display.

3. The computer system according to claim 1, wherein said video memory further includes a serial access memory.

4. The computer system according to claim 1, wherein said video memory operates in parallel with said system memory.

5. A display system, comprising:

a microcontroller unit having a system bus, wherein said microcontroller unit further includes:

a system memory connected to said system bus;

a video memory connected to said system bus;

a video display; and a display controller connected only between said system bus and said video display wherein a data width of said video memory is independent of a data width of said display controller.

6. The display system according to claim 5, wherein said video memory is further coupled to said video display.

7. The display system according to claim 5, wherein said video memory further includes a serial access memory.

8. The display system according to claim 5, wherein said video memory operates in parallel to said system memory.

* * * * *